(12) United States Patent
Hara

(10) Patent No.: US 6,799,415 B2
(45) Date of Patent: Oct. 5, 2004

(54) LOOP CHAIN STRUCTURE

(76) Inventor: Yutaka Hara, 6-2-12, Suehiro 6-jo, Asahikawa-shi, Hokkaido (JP)

( * ) Notice: Subject to any disclaimer, the term of this patent is extended or adjusted under 35 U.S.C. 154(b) by 0 days.

(21) Appl. No.: 10/274,889

(22) Filed: Oct. 22, 2002

(65) Prior Publication Data

US 2004/0074222 A1 Apr. 22, 2004

(51) Int. Cl.⁷ .............................................. F16G 15/04
(52) U.S. Cl. .................................. 59/85; 59/78; 59/93
(58) Field of Search .............................. 59/78, 82, 85, 59/86, 89, 90, 93

(56) References Cited

U.S. PATENT DOCUMENTS

| | | | | |
|---|---|---|---|---|
| 423,260 A | * | 3/1890 | Kelley | 59/78 |
| 727,718 A | * | 5/1903 | Vail | 59/78 |
| 727,719 A | * | 5/1903 | Vail | 59/78 |
| 4,353,203 A | * | 10/1982 | Lotoski | 59/85 |

* cited by examiner

Primary Examiner—David B. Jones
(74) Attorney, Agent, or Firm—Oblon, Spivak, McClelland, Maier & Neustadt, P.C.

(57) ABSTRACT

For the purpose of providing a loop chain in which light-related members can be easily attached to and detached from the loops, and do not readily fall off, and which has a good appearance from the standpoint of design, a loop 3 is provided with an engaging tab 3a, 3b, and a latching adapter 10 comprising a light-related member or a latching adapter 15 is fitted to the engaging tab.

9 Claims, 4 Drawing Sheets

(a)

(b)

(a)

(b)

LOOP CHAIN STRUCTURE

BACKGROUND OF THE INVENTION

1. Field of the Invention

The present invention relates to the structure of a loop chain.

2. Description of the Related Art

Loop chains have been used for some time to establish restricted entry boundaries for parking garages and off limits areas, for example.

As shown by one portion of a chain of FIG. 7, a loop chain such as this is constituted by respective loops A, B, C and so forth, made from either a metal or a plastic.

Based on the figure, this structure will be simply explained by focusing on loop B. In general, a loop is constituted by forming a cylindrical element into an elliptical shape, and such an element can be integrally formed in the forming process. B' is the joining portion, and after interlinking loops A and C, this joining portion is secured as needed via either welding or bonding.

This loop chain can be used in various ways. For example, when utilizing a loop chain for establishing a restricted entry boundary for a parking garage, off limits area or the like, there is an extremely high risk of people and vehicles running into the loop chain because they are unable to discern its presence at night and other times when visibility is poor. As a safety measure to prevent this, loop chains have been constituted so as to be discernible to the naked eye by either using luminous members as the members of a loop chain, or covering the loop chain with reflective plating or luminous members.

However, in the structure of a conventional loop chain constituted as described hereinabove, when luminous members were used as loop chain members, the effect thereof disappeared when the life of the luminescence expired, and loop chains that simply had reflective plating or luminous members attached suffered from problems, such as [the reflective plating or luminous members] being apt to fall off, and poor appearance from the design standpoint.

SUMMARY OF THE INVENTION

An object of the present invention is to provide a loop chain that solves for the above problems.

To achieve this object, at the least one engaging tab is provided on each loop of this loop chain.

Further a latching adapter is provided so as to be removably attached to the engaging tab.

Yet further, the above-mentioned engaging tab is provided on the outside surface of a loop, so that the latching adapter is to this engaging tab.

Yet further, an engaging hole is formed in the engaging tab, and the latching adapter comprises a member for fitting within this engaging hole and latching together.

Yet further, a latching groove is formed in the engaging tab, and latching adapter is provided with a member for fitting within this latching groove and latching together.

Yet further, the above-mentioned latching adapter comprises either a light-reflecting member or a luminous member.

Yet further, each loop of a resin loop chain comprises members which have been segmented into blocks, and each loop is constituted by integrally combining these members.

Yet further, each loop of a resin loop chain comprises members of an outer portion and an inner portion for reinforcement, and each loop is constituted by integrally combining these members.

Yet further, the loop is made of a plastic resin material, and the end portions of the joining portion of this loop are tapered such that slopes are formed at approximately 45° above and below the central axis thereof and face each other.

Yet further, the loop is formed from a luminous material.

DESCRIPTION OF THE PREFERRED EMBODIMENTS

Embodiments of the structure of a loop chain of the present invention will be explained on the basis of the figures.

Figure 1:
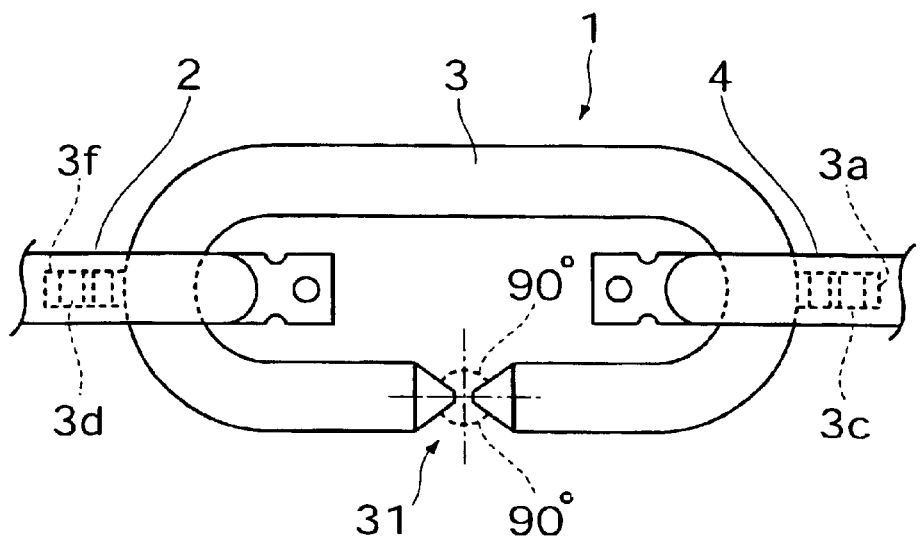
FIG. 1 is a relational plan view showing a part of a loop interlinking state in a loop chain of the present invention.

FIG. 1 is a relational external view showing a part of the interlinking state of a loop in the structure of a loop chain 1.

Figure 2:
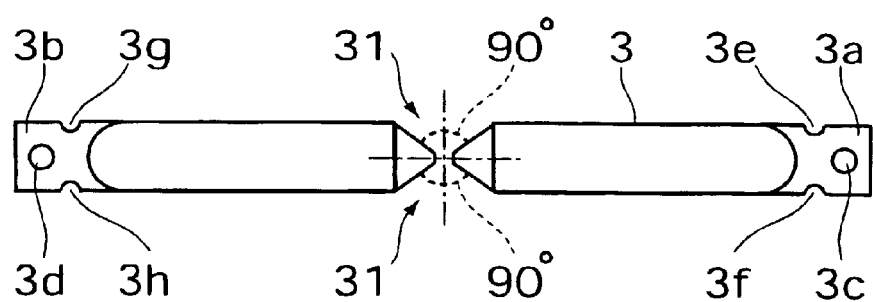
FIG. 2 is a relational diagram showing the loop of FIG. 1 as seen from the side.

FIG. 2 is a relational diagram showing the loop 3 of FIG. 1 as seen from the side.

Each loop of a loop chain has a same shape, and the explanation given here is based on loop 3.

In the figures, a diagram shows a state in which a loop 2 and a loop 4 are interlinked to loop 3 on both sides, 3a and 3b are engaging tabs integrally formed on loop 3, and on each engaging tab 3a, 3b, respectively, there are formed engaging holes 3c, 3d and latching grooves 3e, 3f, 3g, 3h.

Further, 3i of loop 3 indicates the joining portion, and the end portions of the left and right sides on the drawing are tapered to form slopes of nearly 45° in respect of the central axis of the loop (nearly 90° overall), and face each other, so that another loop is easily linked thereto.

This joining portion 3i can be affixed by welding or the like after the chain has been formed. Next, using engaging tab 3a of the above-mentioned loop 3 as a typical example, the method for attaching a latching adapter will be explained based on FIG. 3 and FIG. 4.

This latching adapter is one of the important elements of the present invention.

Figure 3:
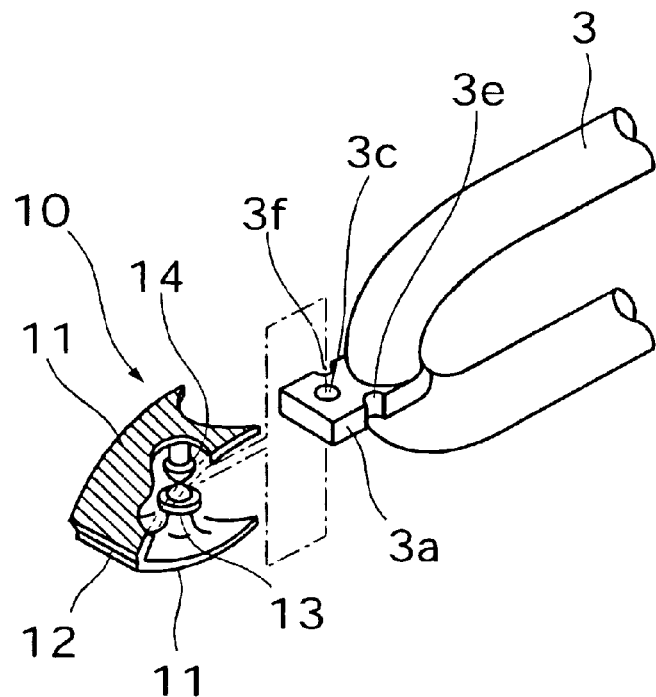
FIG. 3 is a relational external view showing a state in which an adapter is attached to a loop in a loop chain of the present invention.

FIG. 3 is a diagram showing a state in which a latching adapter 10 of the left side is being fitted into engaging hole 3c of engaging tab 3a of loop 3.

Latching adapter 10 is constituted in the shape of a snap, upper and lower plates 11, 11 are integrally provided on a hinge part 12, either a reflective member or an optical member is provided on the respective outer surfaces thereof, and a male part 13 and a female part 14, which are the snap-in coupling members, are provided on the respective inner surfaces thereof.

As indicated by the insertion arrow line of the figure, latching adapter 10 is attached to loop 3 by male part 13 and female part 14, constituting a snap-in coupling member, being inserted into engaging hole 3c of engaging tab 3a in a latched condition, thereby completing the coupling of the two elements.

Figure 4:
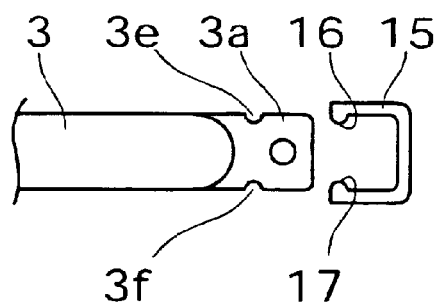
FIG. 4 is a relational external view showing a state in which an adapter of a type that differs from the embodiment of FIG. 3 is attached to a loop in a loop chain of the present invention.
Figure 4:
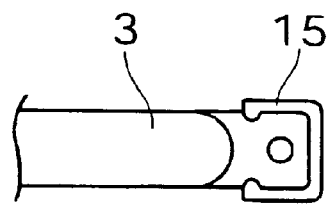

FIG. 4 is a relational diagram showing the connection to engaging tab 3a of loop 3 when a different latching adapter is used.

FIG. 4(*a*) shows a state in which a latching adapter 15 is about to be inserted in a latched condition (snapped in) to engaging tab 3a of loop 3, and latching adapter 15 comprises either a reflective member or a luminous member on the surface thereof, and latching claws 16, 17 are integrally formed on the respective end parts thereof.

When latching adapter 15 is inserted into engaging tab 3a of loop 3, latching claws 16, 17 are coupled in a latched condition to latching grooves 3e, 3f of engaging tab 3a, constituting the state of (b) in FIG. 4 and completing the coupling of the two elements.

As explained hereinabove, because either a light-reflecting member or a luminous member is provided on a latching adapter of the present invention, it can be attached or detached as needed in line with utilization requirements, thus improving all the discrepancies associated with a conventional loop chain.

Further, because a loop related to the present invention can be constituted from a luminous material, design-wise it is desirable in combination with a latching adapter, and can be seen as further improvement of the original purpose of a loop chain.

Next, an embodiment related to the constitution of a loop and an embodiment related to a reinforcing structure, which are elements of the present invention, will be explained.

Figure 5:
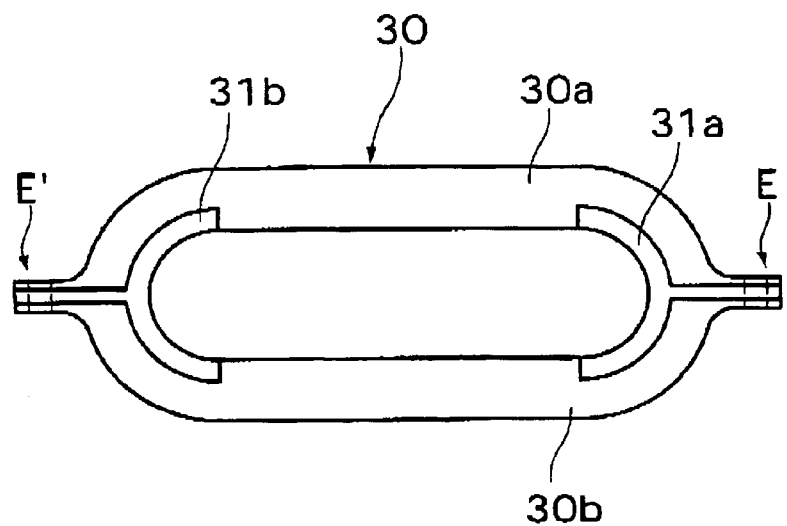
FIG. 5 is a relational plan view showing reinforcing structures of a loop in a loop chain of the present invention.

FIG. 5 shows a relational diagram of one loop on a loop chain related to the present invention.

A loop 30 is constituted from members 30a, 30b, 31a, 31b, and members 31a, 31b are arranged by segmenting loop 30 on the inside of both sides, and constitute integral structures, which are layered with member 30a and member 30b.

Shape and material of members 31a, 31b are selected so that they serve as reinforcing blocks when provided in portions where other loops are linked.

As described hereinabove, the respective segmented members are combined, and integrated in a layered condition, and the fastening thereof can be carried out at opposite ends E, E' of loop 30 with latching locks or the like, which are not shown in the figure, but which are based, for example, on well-known bonding, mechanical fastening or spring materials. When assembling a loop chain, this fact makes it possible for assembly to be carried out via extremely simple work.

Figure 6:
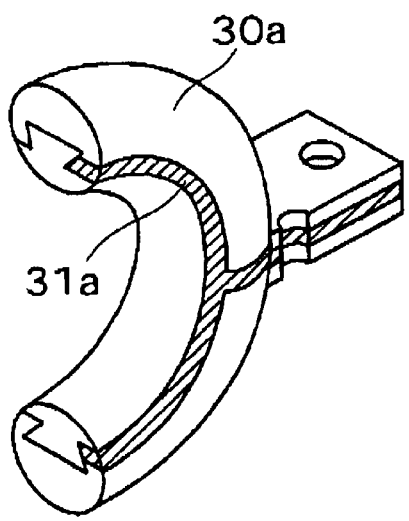
FIG. 6 is relational external views of the loop of FIG. 5.
Figure 6:
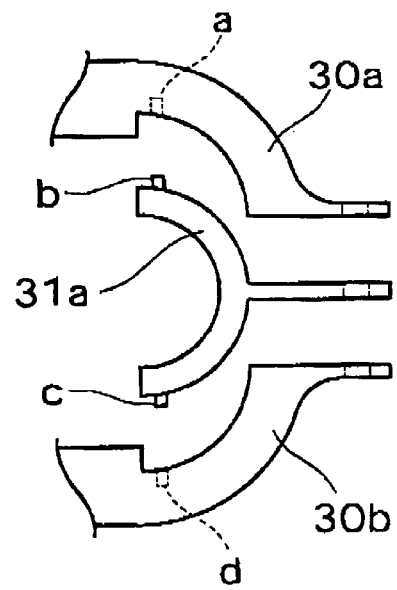
Figure 7:
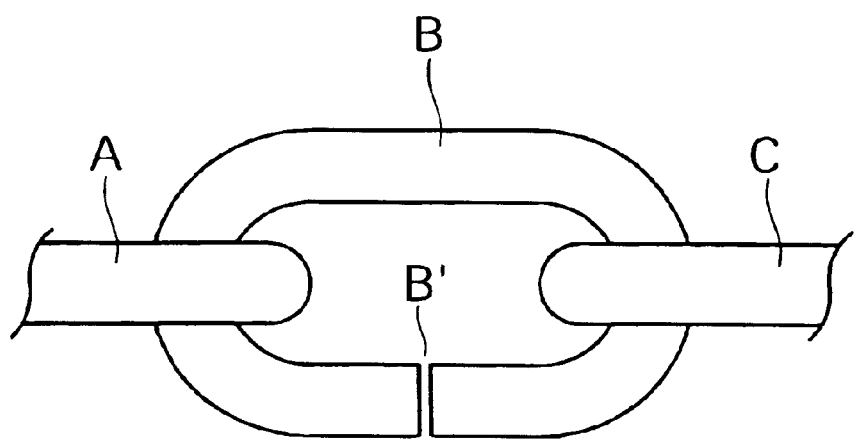
FIG. 7 is a relational plan view showing a conventional loop chain.

FIG. 6(*a*) shows a sectional relational external view of a portion comprising reinforcing member 31a of loop 30 shown in FIG. 5 as an embodiment.

Further, FIG. 6(*b*) is a relational diagram showing the members 30a, 30b into which loop 30 is segmented, and reinforcing member 31a shown in FIG. 5 as another embodiment.

When the above separated respective members 30a, 31a, 30b, etc. are integrally attached in a fixed condition, this is carried out by joining together fitting holes a, d of members 30a, 30b with engaging protrusions b, c of reinforcing member 31a.

The invention devised by the inventors has been explained in detail hereinabove on the basis of the embodiments, but, needless to say, the present invention is not limited to the above-mentioned embodiments, and can be modified in various ways within a scope that does not deviate from the gist thereof.

For example, in the present invention, the loop chain material disclosed as the embodiment is primarily plastic resin, but this material can also be a metal, a non-metal, or a combination of a metal and a non-metal.

Further, the engaging tabs, which are provided in a loop, can be provided not only in the outer surface of a loop, but also on the inner surface of a loop, where they will not interfere with the interlinking of the loop.

Furthermore, in the description of the present invention, there is an explanation of a luminous member, but this also comprises a luminous member.

As explained hereinabove, according to the present invention, because engaging tabs are provided on each loop of a loop chain, and an adapter which comprises, for example, a luminous member, is attached thereto, this adapter can be easily attached to an arbitrary location of a loop, and adapters comprising various light-related members can be utilized.

Since this makes it easy to attach various adapters to a loop chain, and makes for a secure attachment, there is no fear of an adapter falling off.

Accordingly, a loop chain of the present invention, which is used to establish a restricted entry boundary for a parking garage or an off limits area, for example, is advantageously suitable for uses not available in the past.

Further, if adapters are provided with light-source members, a loop chain of the present invention can also be utilized for illumination purposes.

Further, since the joining portion of each loop of a loop chain of the present invention is formed into a suitable tapered structure, attaching the loops becomes an extremely simple task.

Further, because loops of a loop chain of the present invention can be constituted from a luminous material, in this case, a desirable effect can be obtained in terms of aesthetic design when combined with adapters made of the same material, and it also can be seen as improvement on the original purpose of the loop chain.

Further, since loops of a loop chain of the present invention are formed in a layered structure including a reinforcing material, this constitution strengthens the loop chain, and depending on the specifications in particular, can adequately deal with the demand for stronger linking parts between loops.

Further, since the present invention also allows use of a segmented structure for the loop itself, the assembly of a loop chain becomes very easy, and workability is thereby enhanced.

What is claimed is:

1. A loop chain structure, comprising:
   a plurality of loops interlinked with each other to form the loop chain structure, at least one of the plurality of loops having an engaging tab; and
   a latching adapter removably attached to said engaging tab.

2. The loop chain structure according to claim 1, wherein said engaging tab is provided on an outside surface of said at least one of the plurality of loops.

3. The loop chain structure according to claim 2, wherein an engaging hole is formed in said engaging tab, and said latching adapter comprises a member engaged in the engaging hole.

4. The loop chain structure according to claim 2, wherein a latching groove is formed in said engaging tab, and said latching adapter comprises a member engaged in the latching groove.

5. The loop chain structure according to any one of claim 2 through claim 4, wherein said latching adapter comprises either a light-reflecting member or a luminous member.

6. The loop chain structure according to claim 1, wherein one of the plurality of loops includes a plastic material and is constituted by integrally combining members segmented into blocks.

7. The loop chain structure according to claim 6, wherein one of the plurality of loops includes a resin material and is constituted by integrally combining an outer member formed in an outer portion thereof and a reinforcing member formed in an inner portion thereof.

8. The loop chain structure according to claim 1, wherein one of the plurality of loops is made from a plastic resin material and has a first end portion and a second end portion facing the first end portion, and forming a gap between the first end portion and the second end portion, and wherein the first end portion is tapered toward the second end portion and the second end portion is tapered toward the first end portion.

9. The loop chain structure according to claim 1, wherein one of the plurality of loops includes a luminous material.

* * * * *